United States Patent [19]
Kyzer et al.

[11] Patent Number: 5,628,607
[45] Date of Patent: May 13, 1997

[54] ADAPTABLE TRAILER AND TRAILER SYSTEM

[75] Inventors: Daniel P. Kyzer, Lexington; Michael P. Higgins, Charleston; Jeffrey M. Shealy, Gilbert, all of S.C.; Joseph C. Morris, Jr., Palm Beach Garden, Fla.

[73] Assignee: Integrated Cargo Systems, L.L.C., Gilbert, S.C.

[21] Appl. No.: 561,483

[22] Filed: Nov. 20, 1995

[51] Int. Cl.$^6$ ............................................. B60P 1/02
[52] U.S. Cl. .................. 414/495; 280/43.23; 414/498
[58] Field of Search ...................... 280/43.12, 43.23; 414/498, 396, 495, 572, 584, 401

[56] References Cited

U.S. PATENT DOCUMENTS

| | | | |
|---|---|---|---|
| 2,750,058 | 6/1956 | Burch | 414/498 |
| 2,756,963 | 7/1956 | Rogers | 280/43.12 |
| 2,844,385 | 7/1958 | Pribonic | 280/6.1 |
| 3,445,013 | 5/1969 | Scheinert | 410/2 |
| 3,497,092 | 2/1970 | McIntyre | 414/495 |
| 3,544,127 | 12/1970 | Dobson | 280/43.23 |
| 3,682,337 | 8/1972 | May et al. | 214/152 |
| 3,840,210 | 10/1974 | Hollingsworth | 280/43.23 |
| 4,050,707 | 9/1977 | Glumac | 280/43.23 |
| 4,053,072 | 10/1977 | Ross et al. | 414/498 |
| 4,061,353 | 12/1977 | Kingman et al. | 280/106 T |
| 4,076,299 | 2/1978 | Dalton | 296/35 A |
| 4,372,514 | 2/1983 | Glumac | 248/163 R |
| 4,474,359 | 10/1984 | Weaver | 254/8 |
| 4,568,236 | 2/1986 | LeBoeuf et al. | 414/495 |
| 4,621,972 | 11/1986 | Grotte | 414/498 |
| 4,685,855 | 8/1987 | Celli | 414/498 |
| 4,915,577 | 4/1990 | Fraser | 280/43.23 |
| 4,943,193 | 7/1990 | Koskinen et al. | 410/69 |
| 5,083,892 | 1/1992 | Oswald et al. | 414/498 |
| 5,417,540 | 5/1995 | Cox | 414/498 |

*Primary Examiner*—Thomas J. Brahan
*Attorney, Agent, or Firm*—Michael A. Mann, P.A.

[57] ABSTRACT

An adaptable trailer and trailer system that is especially well suited for transporting cargo in vertically restricted areas and for transporting cargo up and down inclines. The trailer system comprises a trailer and a cradle. The cradle is designed to carry a cargo and has an opening into which the trailer can be inserted so that the cradle may be transported. The trailer and cradle have an aligning system that works to correctly position the cradle onto the trailer. Additionally, the trailer comprises a carriage, an outer frame, an inner frame, and a front frame. The front frame is integral with the outer frame and has means for connecting the trailer to a towing vehicle. The inner frame of the trailer is pivotally attached to the outer frame and can be raised and lowered to meet the cradle, once the trailer and cradle are in position. The inner frame, carrying the cradle, may be lowered until the top surface of the inner frame and the top surface of the outer frame are approximately coplanar, thus presenting a low profile for the trailer when carrying the cargo. Furthermore, the carriage is pivotally attached to the outer frame and has cylinders which can be actuated to raise the rear end of the trailer, so that the rear end will not scrape as the trailer ascends a ramp.

10 Claims, 5 Drawing Sheets

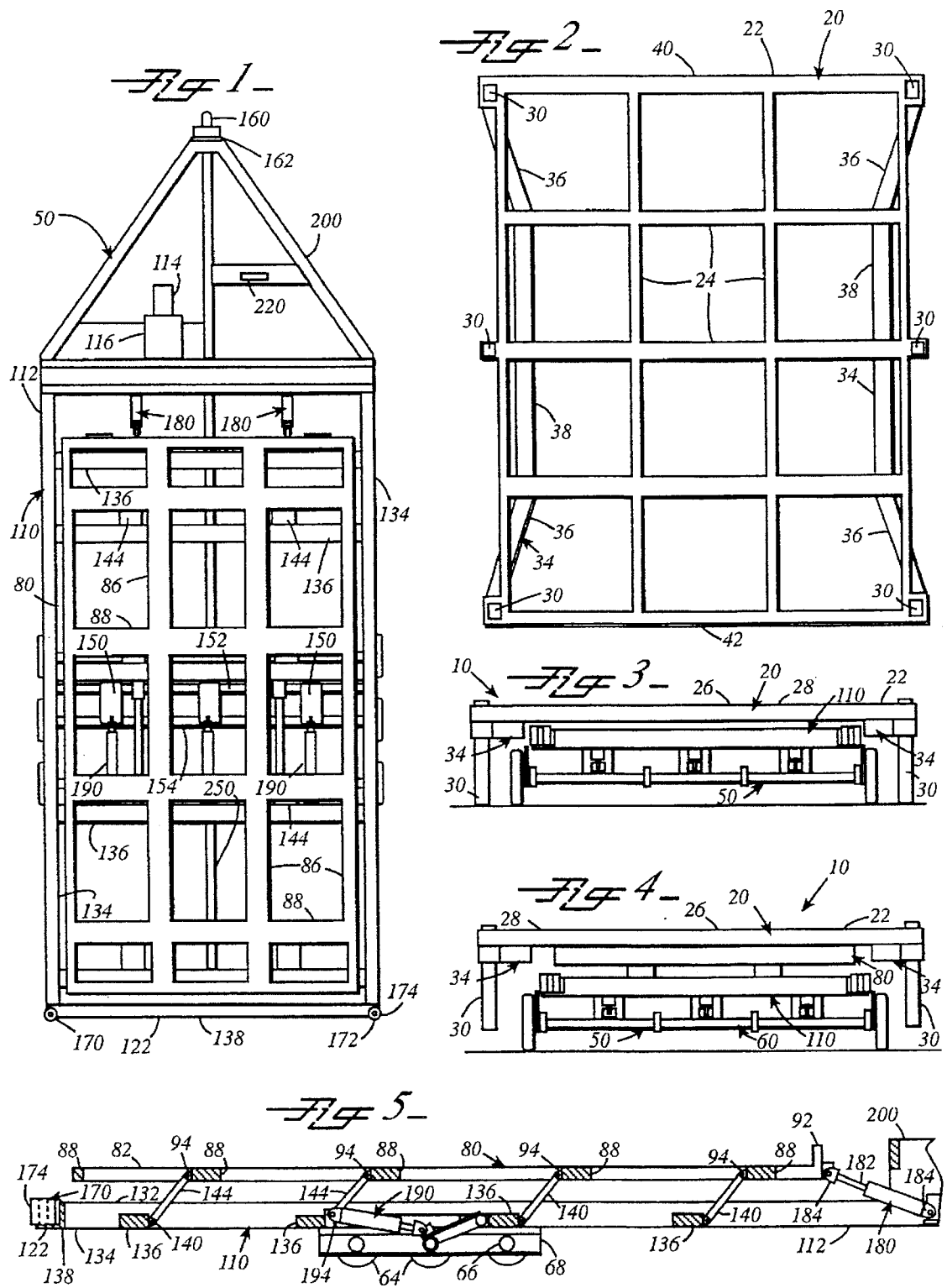

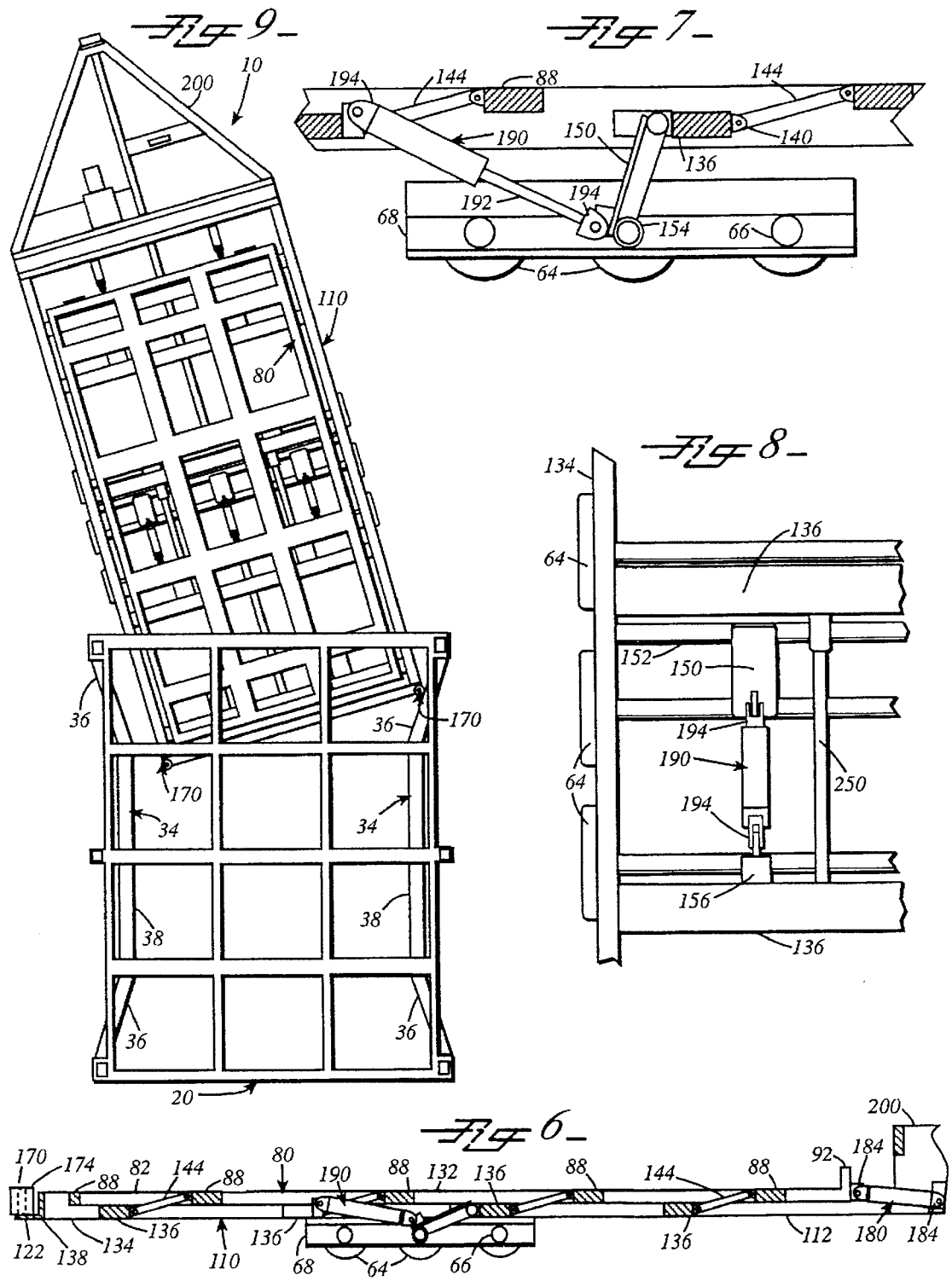

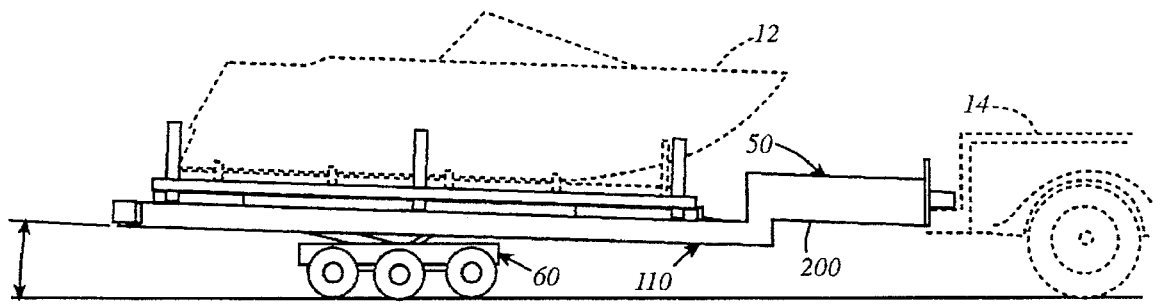
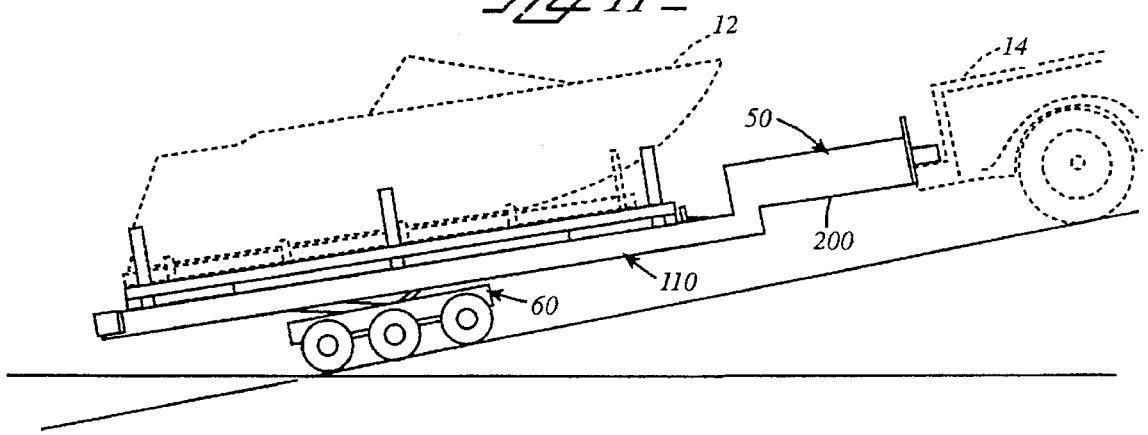
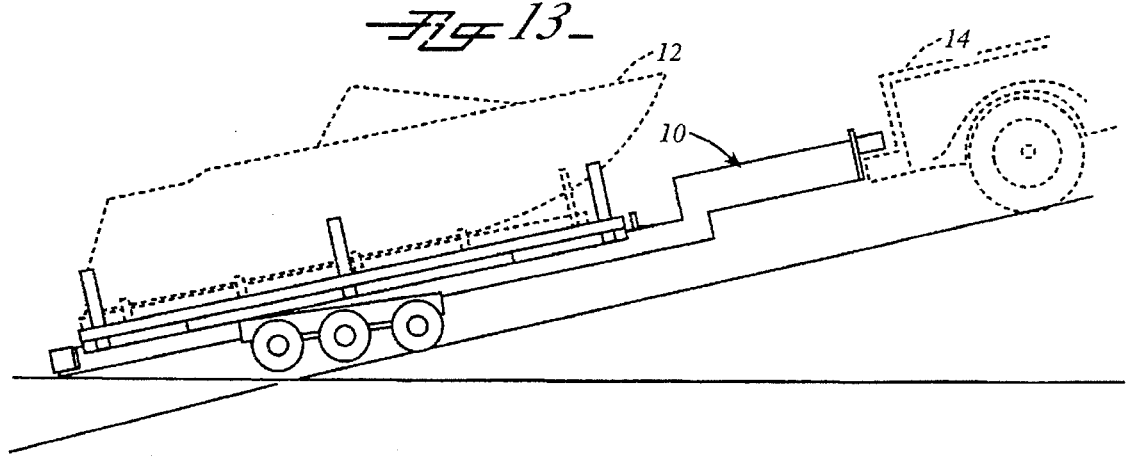

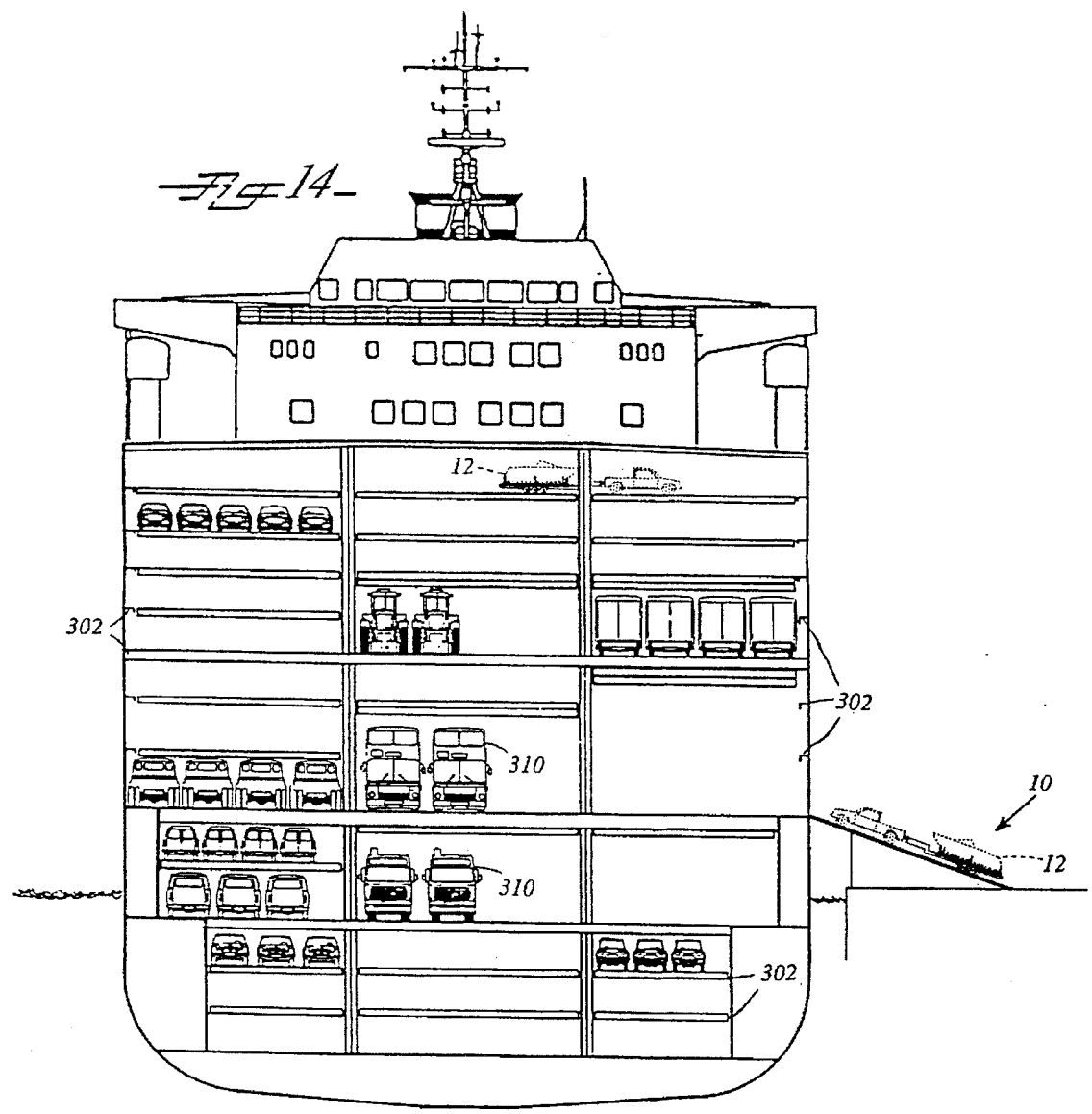

ADAPTABLE TRAILER AND TRAILER SYSTEM

BACKGROUND OF THE INVENTION

1. Field of the Invention

The present invention relates to trailers and carriages for transporting and supporting cargo. In particular, the present invention relates to a trailer especially suited for carrying and loading cargo onto ocean-going ships having side or stern ramps.

2. Discussion of Background

Shipping and the ability to transport cargo in vast quantities has made oceanborne shipping the dominant method for the transportation of cargo. Ships that carry manufactured goods, rather than large quantities of bulk goods (wheat, grain, etc.), have numerous levels or decks throughout the ship. These decks are restricted in their height, which maximizes the number of decks per ship. However, by restricting the vertical dimension of these decks, the ability to load and unload cargo into these restricted areas is limited. Consequently, the cargo carrying devices and vehicles that transport the cargo onto and off of the ships must be of the size that will maximize the amount of cargo the ship is able to transport.

These ships that have numerous cargo decks are also known as roll-on, roll-off ships or "Ro-Ro" ships. "Ro-Ro" ships generally have either a side or stern ramp that can be adjusted for tidal variations. These ramps may have very small or relatively very large inclines with respect to the dock or other port facilities.

Often, cargo loads and unloads under its own power, for example, cars, trucks, and construction equipment. However, there is an abundance of cargo that is carried by carriage or pallet systems that must be loaded by trailers or forklifts. Some of the cargo obviously can be too big for a forklift to carry or maneuver within the restricted confines of the ship, and thus must be transported by trailer.

The forklifts or trailers must carry the cargo onto the ship, up the ramp, and then around the decks of the ship to its stowing space. To reach different decks on the ship the trailer and forklifts must also ascend other numerous ramps. Trailers are typically built of a rigid material, so that as the trailer encounters a ramp or other angular change, the back end of the trailer "bottoms out." When a trailer "bottoms out," the back end will scrape the ground or lower surface, thus redistributing the weight of the trailer. This redistributing of the weight may be borne by the towing vehicle, the back end of the trailer, or one of multiple axles on the trailer. Consequently, this action can be very damaging to the trailer, the ramps, and possibly the cargo.

Therefore, there is a need for a trailer that is suitable for loading and unloading cargo onto a ship having a stern or side ramp, which is maneuverable within the vertical and width restrictions of the ship, when loading and unloading this cargo. Furthermore, there is a need for a trailer that can adjust to ramps and inclines, so that the trailer does not "bottom out."

SUMMARY OF THE INVENTION

According to its major aspects and broadly stated, the present invention is a trailer and trailer system that is adapted to carry a cargo positioned on a cradle. The trailer is especially designed to have a very low profile, thus enabling the cargo to be carried into places that are vertically restricted. Furthermore, the trailer is designed so that the rear of the trailer can be raised when ascending ramps or other vertical inclines, in order to prevent the rear end of the trailer from "bottoming out."

The trailer comprises an outer frame and an inner frame. The inner frame has a raised and a lowered position and is moved between these two positions by two hydraulic cylinders that are pivotally connected between the inner and outer frame. When the inner frame is in its lowered position, the top surface of the outer frame and the top surface of the inner frame are approximately coplanar. In other words, the inner frame is recessed into the outer frame when the inner frame is in its lowered position, thus providing a lower profile. The inner frame is pivotally connected to the outer frame by a plurality of support bars, which pivot with respect to the inner frame and the outer frame when the inner frame is moved between its two positions.

The outer frame is pivotally supported on a carriage which preferably comprises three closely spaced axles, each with a corresponding pair of wheels. A series of hydraulic cylinders is pivotally carried by the carriage and pivotally connected to the outer frame. These cylinders, when actuated, raise and lower the rear of the outer frame with respect to the ground. Therefore, when the trailer ascends or descends a ramp, the rear end of the trailer can be raised, thus preventing the trailer from "bottoming out."

The trailer system also comprises a cradle that is capable of supporting a cargo. The cradle has a set of legs, preferably six, which support the cradle, but can be retracted out of the way when the cradle is being transported by the trailer. The cradle also has a wedge-shaped receiving means positioned on both ends of the cradle. Positioned on the rear end of the trailer is a pair of roller aligning means. The roller aligning means engage the wedge-shaped receiving means of the cradle, and thus correctly align the trailer beneath the cradle.

In operation, the cradle is positioned with its legs extended, supporting cargo. The trailer is positioned under the cradle with their alignment assured by the cooperation between the receiving means and the aligning means. The inner frame is raised to meet the bottom of the cradle and relieve the load from the cradle's legs, thus supporting the weight of the cradle. The legs of the cradle are retracted, so that the inner frame can be lowered until the cradle contacts the outer frame. Now, the cradle is in position to be transported while presenting a relatively low profile. If the trailer encounters a ramp, the rear end of the trailer can be raised by actuating the hydraulic cylinders of the carriage, thus better stabilizing the cargo and preventing the trailer from "bottoming out."

An important feature of the present invention is that the inner frame retracts within the outer frame, so that the top surface of the inner frame and the top surface of the outer frame are approximately coplanar. By having the inner frame retract within the outer frame, the frame presents a lower profile, which is important when towing the trailer in a vertically restricted area.

Another important feature of the present invention is the ability of the rear end of the trailer to be raised. By raising the rear end of the trailer, the trailer does not "bottom out." If the trailer were allowed to "bottom out", a redistribution of weight along the multiple axles of the trailer could be damaging.

Still another feature of the present invention is the aligning and receiving means of the trailer and cradle respectively. This feature gives an operator a margin of error when backing the trailer under the cradle. Furthermore, the receiving means positioned on both ends of the cradle allows the operator to position the trailer from either side of the cradle.

Yet another feature of the present invention is the trailer system, which is especially adapted for loading and unloading cargo onto and off of a ship. Not only can cargo be loaded and unloaded easier and quicker, the entire logic in cargo transportation and storage is upgraded. For example, manufactures can load their products onto a cradle, instead of a wooden frame or pallet. This cradle can be transported to the loading docks, at which point a trailer, as described in the present invention, can come by and easily load the cradle and its cargo onto a ship.

Still another feature of the present invention is the ability of cargo to now be loaded into areas on a ship that were previously inaccessible. Typically, certain types of cargo need to be loaded by a forklift. However, because of the vertical dimensions of the forklift, this cargo could not be placed into certain decks on the ship, thus resulting in wasted air space within the ship that would normally be used to carry cargo. The trailer and cradle, which can now carry this cargo, present such a low profile that access into the vertically restricted decks is not a concern. Therefore, this cargo can be loaded onto decks, such that the cargo maximizes the three dimensional storage area.

Yet another feature of the present invention is the increased maneuverability of the trailer and trailer system in three dimensions. The closely spaced axles and wheels, in conjunction with the cylinders that raise the rear end of the outer frame, increase the maneuverability of the trailer system in areas of restricted dimensions.

Other features and advantages of the present invention will be apparent to those skilled in the art from a careful reading of the Detailed Description of a Preferred Embodiment presented below and accompanied by the drawings.

BRIEF DESCRIPTION OF THE DRAWINGS

In the drawings,

FIG. 1 is a top view of a trailer according to a preferred embodiment of the present invention;

FIG. 2 is a top view of a cradle according to a preferred embodiment of the present invention;

FIG. 3 is a rear view of a trailer positioned under a cradle with the inner frame in the lowered position, according to a preferred embodiment of the present invention;

FIG. 4 is a rear view of a trailer positioned under a cradle with the inner frame in the raised position, thus lifting the cradle, according to a preferred embodiment of the present invention;

FIG. 5 is a cross-sectional view along line 5—5 of FIG. 4, with the cradle removed for clarity, according to a preferred embodiment of the present invention;

FIG. 6 is a cross-sectional view along line 6—6 of FIG. 3, with the cradle removed for clarity, according to a preferred embodiment of the present invention;

FIG. 7 is a cross sectional detail view of a trailer with the outer frame in the raised position according to a preferred embodiment of the present invention;

FIG. 8 is a top detail view of a trailer and hydraulics with the inner frame removed for clarity, according to a preferred embodiment of the present invention;

FIG. 9 is top view of a trailer and cradle, where the trailer is inserted into the cradle, according to a preferred embodiment of the present invention;

FIG. 10 is a side view of a trailer system with the rear end of the trailer raised, according to a preferred embodiment of the present invention;

FIG. 11 is a side view of a trailer system ascending a ramp with the rear end of the trailer raised, according to a preferred embodiment of the present invention;

FIG. 13 is a side view of a trailer system without the ability to raise the rear end of the trailer; and FIG. 14 is a rear view of an ocean-going ship with a trailer system shown within the ship according to the preferred embodiment of the present invention.

DETAILED DESCRIPTION OF A PREFERRED EMBODIMENT

Figure 12A:
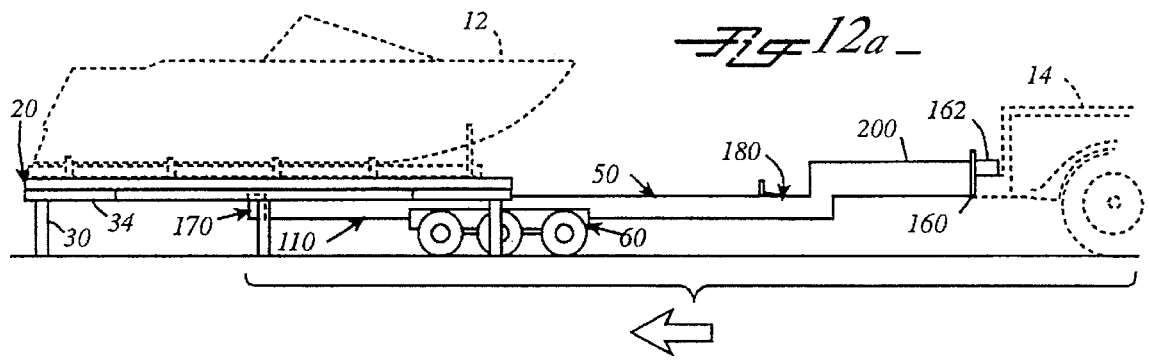
FIGS. 12A–D is a side view of a trailer system depicting its sequence of operation, according to a preferred embodiment of the present invention.

Referring now to FIGS. 1–12, the adaptable trailer system 10 is shown. Trailer system 10 is especially suited to loading and carrying a cargo 12 onto and off of an ocean-going ship. The ships preferably considered by the present invention are those ships having stern or side ramps where the ramp fluctuates with tidal variations. These ships have vertically restricted cargo storing areas, and trailer system 10 provides a convenient method for transporting cargo 12 about the ship such that the maximum amount of cargo 12 can be carried without being limited by the vertical height restrictions.

The present invention is also well suited to prevent trailer system 10 from "bottoming out" as trailer system 10 ascends or descends a ramp 16, like those on the above described ships and as shown in FIG. 11. "Bottoming out," as described in this disclosure, is when a vehicle or trailer (as in this case) ascends or descends a ramp or other incline, and the bottom of the vehicle or trailer comes in contact with a surface. "Bottoming out" occurs either because the incline is too steep or the vehicle or trailer is too long. (It can also be caused by a combination of these two.)

The present invention as described by the appended claims is well suited for numerous applications, as will be recognized by those skilled in the art. However, the present invention should not be construed to be limited to the application described in this disclosure.

For the intended application of the present invention, carrying cargo 12 onto and off of a ship, materials for the construction of trailer system 10 should be selected such that weights of typical cargo loads can be supported. Therefore, it is contemplated that different elements of trailer system 10 could be constructed having different weight ratings. For example, trailer system 10 or various elements of trailer system 10 could be rated for carrying and transporting cargo 12 weighing less than 2,000 pounds, or could be designed to carry loads greater than 10,000 pounds.

Trailer system 10 comprises a cradle 20 and a trailer 50. Cradle 20 is capable of carrying cargo 12 like that shown in FIGS. 12A–12D. Cradle 20 is carried by trailer 50, as will be described in further detail below, and is towed by a vehicle 14. While cargo 12 is shown as a boat, other types of cargo 12 are possible and contemplated by this disclosure. Consequently, the depiction of cargo 12 as a boat should not be construed as limiting the application of trailer system 10 which is defined by the appended claims.

It should be noted that the features and advantages of trailer system 10, as described herein, could be combined into a single unit that is both trailer 50 and vehicle 14, thus eliminating the need for a separate trailer 50 and vehicle 14. Consequently, trailer 50 as described throughout this disclosure and defined by the appended claims can be constructed, so that it is self-propelled, thus eliminating the need for a separate towing vehicle 14. Those skilled in the art will recognize that this adaptation can be accomplished by combining the teachings of this disclosure with a self propelled vehicle. Therefore, the term "trailer system" and "trailer" as defined by the appended claims include not only "trailers" that are towed by a vehicle, but also self propelled vehicles functioning and performing the tasks as taught by this disclosure.

Cradle 20 comprises a base 22, a plurality of legs 30, and a receiving device 34. Base 22 is a combination of cross members 24 which form a substantially flat framework defining a surface on which cargo 12 can be placed and to which cargo 12 can be secured. Base 22 has a top surface 26, to which cargo 12 is actually attached. Cross members 24 are preferably formed from lengths of tubular steel that are welded in an approximately rectangular framework. As shown in FIG. 2, cross members 24 are formed in a grid pattern, but those skilled in the art will recognize that other patterns are possible. Furthermore, cross members 24 can be constructed from other sources of material, including steel angle, steel channel, or any other sufficiently rigid material.

Base 22 has a plurality of legs 30 disposed about two of its sides between its front end 40 and its rear end 42, as best seen in FIGS. 2 and 12A–12D. Legs 30 are shown with legs 30 attached externally to base 22, but those skilled in the art will also recognize that legs 30 could be mounted to base 22 in a variety of ways. Legs 30 extend from base 22, thus raising base 22 from the ground and providing an opening 28 into which trailer 50 can be inserted. Therefore, it is necessary that opening 28, defined by legs 30 and base 22, and trailer 50 be dimensioned sufficiently so that trailer 50 fits within opening 28.

In the preferred embodiment, legs 30 comprise six legs 30 that are "ratchet legs." That is, legs 30 are extendable merely by putting pressure on their top side, thus extending them a predetermined distance. Once the weight from supporting cargo 12 has been removed from legs 30, a ratchet bar can be activated which automatically retracts legs 30 without much exertion. Those skilled in the art will recognize that other types of legs 30 or supports are possible and contemplated by this disclosure, and thus should not be construed to limit the present invention as defined by the appended claims.

Legs 30 can be designed to have receiving ends on their top surfaces, so that cradles 20 are stackable. In other words, the bottoms of legs 30 would be inserted into the tops of each other as cradles 20 are stacked. It would also be possible to retract legs 30 or rotate legs 30 out of the way, thus also making it possible to stack cradles 20. The stacking of cradles 20 would be very advantageous on a return trip of a ship. Cradles 20 that were used to transport cargo 12 in one direction could be stacked for the return trip, thus freeing more space for cargo storage.

Positioned under front end 40 and rear end 42 of base 22 and positioned between legs 30, are receiving devices 34. Receiving devices 34 comprise four tracks 36 and two track connectors 38. Tracks 36 and track connectors 38 are preferably constructed of tubular steel, but could be constructed from a variety of material, including steel angle, steel channel, and any other sufficiently rigid material.

Two tracks 36 are positioned on each front end 40 and rear end 42 of base 22 and form a wedge-like shape. Tracks 36 on front end 40 and rear end 42 are connected by track connectors 38, thus forming a continuous length from front end 40 to rear end 42 of base 22 and giving an approximately hour-glass shape. Tracks 36 act to funnel trailer 50 within opening 28, as shown in FIG. 9, and will be discussed in further detail below.

In the preferred embodiment, base 22 of cradle 20 has a rectangular dimension of thirteen feet, eight inches by seven feet, one inch. Including legs 30, the outer width dimension of cradle 20 is approximately eight feet. Tracks 36 and track connectors 38 should be dimensioned so that tracks 36, including the wedge created by tracks 36, will function to guide trailer 50 within opening 28.

Trailer 50 comprises a carriage 60, an inner frame 80, an outer frame 110, and a front frame 200. Carriage 60 preferably has three axles 66, each with a corresponding pair of wheels 64. Axles 66 extend from one side of carriage 60 to the other, and are connected to each other by base supports 68, as best seen in FIGS. 5 and 6. In the preferred embodiment, wheels 64 are thirteen-inch-diameter pneumatic wheels. Pneumatic wheels 64 prove to be better suited than hard material wheels, because pneumatic wheels 64 absorb some of the vibrations caused by transporting trailer 50 and thus prevent this vibration from passing to cargo 12.

Front frame 200 is a triangular shaped structure that is rigidly connected to outer frame 110. Positioned on the front of front frame 200 is a hitch 160 which is positionable on an adjustment plate 162. Hitch 160 can be moved vertically along adjustment plate 162, so that the height of trailer 50 better corresponds to towing vehicle 14. Front frame 200 is preferably vertically offset from outer frame 110, so that hitch 160 will be positioned vertically higher than outer frame 110. This allows outer frame 110 to be positioned lower to the ground, while raising hitch 160, so that it will better connect to towing vehicle 14.

Outer frame 110 comprises an outer platform 130 having a front end 112 and a rear end 122. Outer platform 130 extends from front frame 200 to the rear of trailer 50 and is constructed from longitudinal support struts 134, cross support struts 136, and end strut 138. Longitudinal support struts 134 can be made integral with front frame 200 or can be attached to front frame 200 by some means, such as welding. Longitudinal support struts 134 are connected at the rear of trailer 50 by end strut 138. Disposed between longitudinal support struts 134 are a series of cross support struts 136, which are positioned along the length and bottom of longitudinal support struts 134, as best seen in FIGS. 5 and 6.

Outer frame 110 is pivotally connected to carriage 60 by preferably three rear hydraulic cylinders 190 and lower hinge bars 150. Lower hinge bars 150 are pivotally connected to outer frame 110 at upper pivot point 152, which extends between longitudinal support struts 134 and is connected to one of cross support struts 136. Lower hinge bar 150 is also pivotally connected to carriage 60 at lower pivot mount 154 on one of axles 66. In the preferred embodiment, there are three lower hinge bars 150 corresponding to three rear hydraulic cylinders 190. Rear hydraulic cylinders 190 are pivotally attached to carriage 60 and lower hinge bars 150 at lower pivot mount 154 by pivot flanges 184. Rear hydraulic cylinders 190 are pivotally connected to cross support strut 136 at cylinder mount 156, thus providing a better surface for cylinders 190 to be attached. Lower hinge bars 150 are preferably constructed from a six inch by three inch rectangular steel tube. Additionally, rear hydraulic cylinders 190 are preferably gravity feed cylinders having a two inch diameter and a ten inch shaft 182. Those skilled in the art will recognize that different sizes and styles of cylinders and material may be substituted depending on the application of trailer 50, and thus, these modifications are considered within the scope of this disclosure.

When actuated, rear hydraulic cylinders 190 raise rear end 122 of outer frame 110, as specifically shown in FIGS. 7, 10 and 11. In the preferred embodiment, rear end 122 of outer frame 110 has a nominal ground clearance of approximately nine inches. When rear hydraulic cylinders 190 are extended their full ten inch length, the ground clearance of rear end 122 of outer frame 110 becomes approximately seventeen to twenty inches. Those skilled in the art will recognize that cylinders 190 of a smaller or longer length shaft 192 will decrease or increase, respectively, the change in clearance between the ground and rear end 122 of outer frame 110. In FIG. 7, cylinders 190 have been extended, thus raising outer frame 110 with respect to carriage 60. Outer frame 110 will be raised proportionally to carriage 60 unless trailer 50 is attached to vehicle 14, as seen in FIGS. 10 and 11, in which case rear end 122 of outer frame 110 will be raised even higher with respect to the ground, because of the pivoting action associated by trailer 50 being attached to vehicle 14 at hitch 160.

The ability of rear end 122 of outer frame 110 to be lifted is very advantageous when trailer 50 is ascending or descending a ramp, as seen in FIG. 11. If rear end 122 were not able to be lifted, rear end 122 would scrape or "bottom out" along the ground as shown in FIG. 13. If rear end 122 "bottoms out", the weight of cargo 12 is redistributed along trailer 50. For instance, if "bottoming out" causes a pair of wheels 64 to lose contact with the ground, other of axles 66, rear end 122, or hitch 160 must absorb the weight that axle 66, which is no longer contacting the ground, was supporting.

An operator or stevedore could actuate cylinders 190 manually, when approaching a ramp, but a mercury switch 220, or other sensing device, positioned on trailer 50 to control rear hydraulic cylinders 190, and thus to sense an approaching angular change is preferable. Mercury switch 220 will activate and extend cylinders 190 when an angle of approximately eight degrees (8°) or more is measured. Trailer 50 will experience an angle, and mercury switch 220 will measure a like angle, when trailer 50 encounters a ramp, as in FIG. 11. Consequently, mercury switch 220 is electrically connected to the activating device for cylinder 190, so that as ramp 16 is encountered, rear end 122 of outer frame 110 is raised and does not "bottom out." When rear end 122 of outer frame 110 is in the raised position and mercury switch 220 measures an angular change so that the measured angle is less that eight degrees (8°), cylinders 190 will retract, thus lowering rear end 122. The choice of eight degrees (8°) is merely illustrative of the present invention. Those skilled in the art will recognize that another angle could be substituted. Therefore, the angle measurements as described above should not be construed to limit the present invention.

Positioned on rear end 122 of outer frame 110 is an alignment device 170, which comprises an arm 172 and a roller 174. Alignment device 170 is positioned at the corner of longitudinal support struts 134 and end strut 138. End strut 138 is preferably constructed from angle steel, as seen in FIGS. 5 and 6. Arm 172 projects vertically from end strut 138, and roller 174 is positioned over arm 172, so that arm 172 and roller 174 are in a concentric relationship. Roller 174 preferably projects over the edge of end strut 138 and longitudinal support strut 134 by approximately one-quarter to one-half inch, as best seen in FIGS. 5 and 6. During operation, when trailer 50 is being inserted within opening 28 of cradle 20 at an angle, alignment device 170 will contact tracks 36 of receiving device 34, as best seen in FIG. 9. Roller 174 will rotate on arm 172, thus aligning trailer 50 within opening 28, so that cradle 20 will be positioned correctly on trailer 50.

It should be noted that those skilled in the art will recognize that other support braces 250 may be necessary to provide the rigidity and strength rating for outer frame 110 and carriage 20. Support braces 250 are generally illustrated within the drawings, but modifications to braces 250 are contemplated by this disclosure, and thus should not be construed as limiting.

In the preferred embodiment, arm 172 is constructed from one-half inch diameter bar stock, and roller 174 is constructed from a corresponding cylinder with an inner diameter of at least one-half inch and an outer diameter sufficient so that roller 174 extends over the edge of end strut 138 and longitudinal support struts 134. When trailer 50 is being inserted into opening 28 of cradle 20 and alignment device 170 contacts receiving device 34, arm 172 will typically bend to absorb some of the shock associated with the contact. Furthermore, the combination of alignment device 170 and receiving device 34 will align trailer 50 and cradle 20 by either moving trailer 50 or cradle 20 to one side or the other, so that the two will be aligned, thus positioning cradle 20 correctly onto outer frame 110 of trailer 50.

Inner frame 80, which comprises an inner platform 82 and end stops 92, is pivotally attached to outer frame 110 by pivot bars 144, thus providing a raised position and a lowered position, as seen in FIGS. 3, 4, 5, and 6. Inner platform 82 is generally rectangular in shape, having approximate dimensions of thirteen feet, eight inches by five feet, six inches. Inner platform 82 is constructed from longitudinal support beams 86 and cross support beams 88, which in the preferred embodiment are arranged in a grid type pattern, providing an approximately flat top surface 84. Furthermore, in the preferred embodiment longitudinal support beams 86 and cross support beams 88 are constructed from lengths of tubular steel either integral in length or welded together to form inner platform 82.

Pivot bars 144 are pivotally attached to inner frame 80 at upper attachments 94 on cross support beams 88 and to outer frame 110 at lower attachments 140 on cross support struts 136. At each upper attachment 94 and lower attachment 140, pivot bars 144 pivot about a pin or rod. In the preferred embodiment, there are eight pivot bars 144, which are constructed from six inch by two inch steel tubing and are pivotally attached to cross support beams 88 and cross support struts 134 at upper attachments 94 and lower attachments 140, respectively. Those skilled in the art will recognize that other types and sizes of material may be used for pivot bars 144, and that other types of mounts may be used to pivotally attach pivot bars 144 to cross support beams 88 and cross support struts 134.

Inner frame 80 moves between its raised position and lowered position by pivot bars 144. Forward hydraulic cylinders 180, which are pivotally attached to outer frame 110 and to inner frame 80, operate to move inner frame 80 with respect to outer frame 110. Forward hydraulic cylinders 180 are pivotally attached to outer frame 110 and inner frame 80 by pivot flanges 184, which allow forward hydraulic cylinders 180 to pivot as they actuate. In the preferred embodiment, there are two forward hydraulic cylinders 180, which are three inch diameter cylinders with a six inch shaft 182. When forward hydraulic cylinders 180 are in their retracted position, inner frame 80 is in its lowered position, and as forward hydraulic cylinders 180 move to their extended position, inner frame 80 moves to its raised position. Pivot bars 144 and forward hydraulic cylinders 180 preferably provide six inches of lift to inner frame 80 between its lowered and raised position. If pivot bars 144, as best seen in FIGS. 5 and 6, are longer than shaft 182, then the amount of lift of inner frame 80 between its raised and lowered position, will be controlled by length of stroke of forward hydraulic cylinders 180. Consequently, a longer stroke cylinder will provide a greater lift, and a smaller stroke cylinder will provide less lift, assuming the length of pivot bars 144 is maintained at a length sufficient to provide the maximum desired lift.

As stated above, it is important that the profile of trailer 50 be as vertically small as possible, so that the maximum amount of cargo 12 can be carried by cradle 20 and trailer 50 and still fit within the vertical restrictions of the cargo area in a ship. As shown in FIG. 6, inner frame 80 in its lowered position retracts within the boundaries of outer frame 110, so that top surface 84 of inner frame 80 is approximately coplanar with top surface 132 of outer frame 110. Therefore, when cradle 20 with cargo 12 is positioned onto trailer 50 and inner frame 80 is in its lowered position, trailer system 10 presents a very low profile which maximizes the vertical height of cargo 14. See FIG. 12D. Trailer 50 could be designed, so that inner frame 80 retracts within the boundaries of outer frame 110 where top surface 84 of inner frame 80 and top surface 132 of outer frame 110 are no longer coplanar.

End stops 92 on inner frame 80 are positioned proximate to front frame 200 and extend approximately perpendicular to top surface 84 of inner frame 80. End stops 92 function to limit how much of trailer 50 can be inserted into opening 28 of cradle 20. For example, when trailer 50 is being inserted into opening 28, trailer 50 will continue to move through opening 28 into the length of cradle 20 until end stops 92 contact cradle 20, thus indicating to the operator that trailer 50 is within cradle 20. See FIG. 12B.

Forward hydraulic cylinders 180 and rear hydraulic cylinders 190 operate on hydraulic fluid that is supplied a hydraulic pump 114 and a hydraulic fluid reservoir 116 carried on front frame 200 of trailer 50. The power source (not shown) to operate pump 114 could be carried by trailer 50, for example by a twelve-volt battery. However, it is possible that an external power source could power pump 114. In the preferred embodiment, vehicle 14 functions as an external power source and supplies the power necessary to operate pump 114 and actuate cylinders 180, 190. Furthermore, there are numerous lengths of hydraulic fluid hose (not shown) that connect between each of cylinders 180, 190 to provide the fluid necessary for them to operate.

Figure 12B:
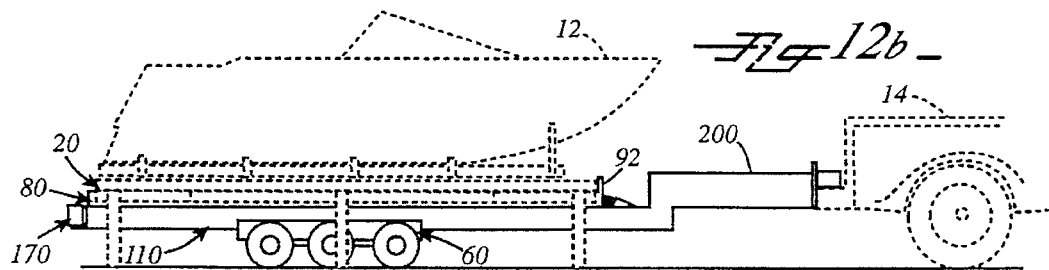
Figure 12C:
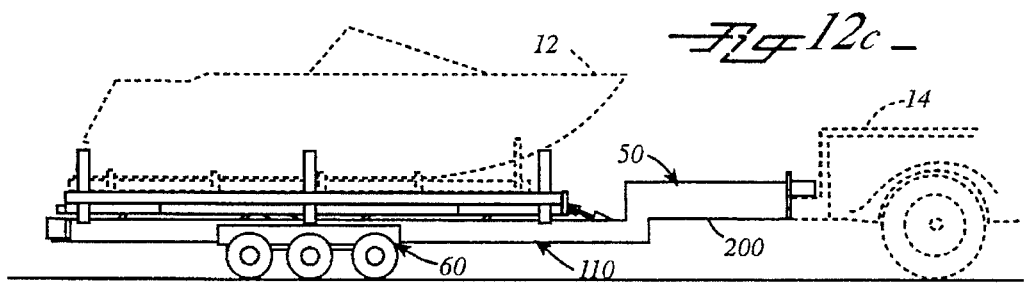
Figure 12D:
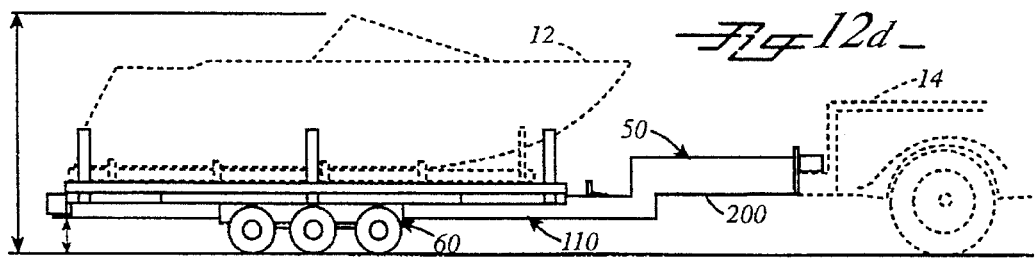

The operation of trailer system 10 is shown specifically in FIGS. 12A–12D. In FIG. 12A trailer 50 is shown backing up, so that trailer 50 is inserted into opening 28 of cradle 20, while alignment device 170 and receiving device 34 act to align trailer 50 under cradle 20. Trailer 50 is inserted under cradle 20 until cradle 20 contacts end stops 92, as seen in FIG. 12B. At this point the operator raises inner frame 80, thus removing the weight legs 30 are carrying. Legs 30 are then retracted so as not to interfere with the operation of trailer 50, as seen in FIG. 12C. Finally, inner frame 80 is lowered until it is in its lowered position, so that trailer 50 including cradle 20 and cargo 12 present the lowest profile possible, as indicated in FIG. 12D. With cradle 20 carrying cargo 12 correctly positioned on trailer 50, trailer system 10 may now be towed onto or off of a ship or into another storage area, while minimizing the vertical height necessary to transport cargo 12 and without running into obstructions.

FIG. 14 is an illustrative view of trailer system 10 is use on an ocean-going ship 300 according to the preferred embodiment. Ship 300 according to FIG. 14 has thirteen decks 302, some of which may be raised to make room for larger cargo 310. Some of decks 302 can not or are not raised and thus have restricted vertical dimensions. Consequently, forklifts are not able to transport cargo 12 to these areas which must be reserved for automobiles of other cargo that is self-propelled. With trailer system 10, cargo 12 is able to be transported and stored in areas that it would not otherwise have ability.

Specifically, in FIG. 14, trailer system 10 is towed up ramp 16 of ocean-going ship 300. Trailer system 10 is then transported either up or down decks 302 by way of other internal ramps on ship 300. Nonetheless, trailer system is now able to venture onto decks 302 and unload cargo 12 onto these decks 302, where cargo 12 was previously not able to be stored.

Other types of lifting configurations could be substituted and still remain within the scope of this disclosure. For example, a scissors-lift device could be substituted for the lifting mechanisms of the inner frame and the outer frame and the outer frame and the carriage. Consequently, these modifications are anticipated by and within the scope of this disclosure.

Those skilled in the art will recognize that other types of material other than tubular steel may be substituted on cradle 20, inner frame 80, outer frame 110, and carriage 60. There are also numerous methods for pivotally attaching the various elements of trailer system 10 to each other, which those skilled in the art will recognize could be substituted in the above description. Furthermore, there are a variety of modifications that forward and rear hydraulic cylinders 180, 190 could undergo without departing from the scope of the present invention. Therefore, these modifications that are taught by this disclosure are within the scope of the present invention.

The dimensions disclosed within this disclosure are intended as illustrative and are of a general nature, so that the general construction and scale of the relative elements of the invention can be interpreted. Those skilled in the art will recognize that dimensional changes could be made depending on the application of trailer system 10. For example, a trailer 50 adapted for extra-heavy use would need larger or stronger material for the construction of inner frame 80 and outer frame 110, as compared to a trailer adapted for relatively light use. Therefore, the dimensions should not be construed as limiting, but merely illustrative of the teachings of this disclosure.

It will be apparent to those skilled in the art that many changes and substitutions can be made to the preferred embodiment herein described without departing from the spirit and scope of the present invention as defined by the appended claims.

What is claimed is:

1. A trailer system capable of transporting a cargo along a surface, said trailer system comprising:

a cradle adapted to carry said cargo, said cradle having a front end and a back end;

a carriage;

an outer frame pivotally carried by said carriage, said outer frame having a top surface, a front end, a rear end, and sides, said rear end having corners with an alignment roller positioned on each of said corners, each of said alignment rollers extending over said rear end of said outer frame and over said sides of said outer frame;

said front end of said cradle and said back end of said cradle having wedge-shaped means for receiving said outer frame; said wedge-shaped means comprising a first connector and a second connector, said first connector and said second connector attached to tracks to form said wedge-shaped means, said first and second connectors positioned on said cradle so that said outer frame fits therebetween when said cradle is positioned over said outer frame;

inner frame pivotally carried by said outer frame, said inner frame having top surface, a first position, and a second position; and means pivotally connected to said outer frame and said inner frame for supporting said inner frame between said first position and said second position.

2. The trailer system as recited in claim 1, wherein said outer frame has boundaries, said top surface of said inner frame retracting within said boundaries of said outer frame when said inner frame is in said first position.

3. The trailer system as recited in claim 1, wherein said trailer further comprises:

at least one cylinder pivotally carried by said outer frame and pivotally connected to said inner frame, said cylinder moving said inner frame between said first position and said second position when said cylinder is actuated; and wherein said supporting means comprises at least one pivoting support connected between said inner frame and said outer frame, so that said top surface of said inner frame and said top surface of said outer frame are approximately coplanar when said inner frame is in said first position.

4. The trailer system as recited in claim 1, wherein said top surface of said inner frame and said top surface of said outer frame are approximately coplanar when said inner frame is in said first position.

5. The trailer system as recited in claim 1, further comprising:

at least one cylinder pivotally carried by said outer frame and pivotally connected to said inner frame, said cylinder moving said inner frame between said first position and said second position when said cylinder is actuated; and wherein said supporting means comprises at least one pivoting support communicating between said inner frame and said outer frame, so that said top surface of said inner frame and said top surface of said outer frame are approximately coplanar when said inner frame is in said first position.

6. A trailer system capable of transporting a cargo along a ground surface, said trailer system comprising:

a cradle adapted to carry said cargo, said cradle having a front end and a back end;

a carriage having a pair of base supports supporting a plurality of wheels, at least one shaft extending between said base supports, at least one pivot mount carried by said at least one shaft;

an outer frame pivotally carried by at least one pivot bar, said at least one pivot bar connected to said at least one pivot mount of said carriage, said outer frame having a top surface, a front end and a rear end;

an inner frame pivotally carried by said outer frame, said inner frame having a top surface, a first position and a second position;

means pivotally connected to said outer frame and said inner frame for supporting said inner frame between said first position and said second position;

means operatively connected to said pivot mount and said outer frame for raising said rear end of said outer frame with respect to said surface so that as said rear end increases in distance from the ground surface, said pivot mount on said at least one shaft increases in distance from said outer frame;

wedge-shaped means carried by said front end of said cradle and said back end of said cradle for receiving said outer frame; and roller means carried by said rear end of said outer frame for aligning said rear end of said outer frame within said wedge-shaped receiving means, so that said roller aligning means engages said wedge-shaped receiving means to correctly align said cradle onto said outer frame and said inner frame.

7. The trailer system as recited in claim 6, wherein said top surface of said inner frame and said top surface of said outer frame are approximately coplanar when said inner frame is in said first position.

8. The trailer system as recited in claim 6, wherein said top surface of said inner frame and said top surface of said outer frame are approximately coplanar when said inner frame is in said first position;

said raising means having a first and a second position, said rear end of said outer frame increasing in distance from the ground surface when said raising means moves between said first position to said second position.

9. The trailer system as recited in claim 6, further comprising means for sensing an angular change and activating said raising means, thus raising or lowering said rear end of said outer frame with respect to said surface.

10. A trailer system capable of transporting a cargo along a ground surface, said trailer system comprising:

a cradle adapted to carry said cargo, said cradle having a front end and a back end;

a carriage having a pair of base supports supporting a plurality of wheels, at least one shaft extending between said base supports, and at least one pivot mount carried by said at least one shaft;

an outer frame pivotally carried by a pivot bar connected to said at least one pivot mount of said carriage, said outer frame having a top surface, a front end, a rear end, and sides, said rear end having corners with an alignment roller positioned on each of said corners, each of said alignment rollers extending over said rear end of said outer frame and over said side of said outer frame;

said front end of said cradle and said back end of said cradle having wedge-shaped means for receiving said outer frame; said wedge-shaped means comprising a first connector and a second connector, said first connector and said second connector attached to tracks to form said wedge-shaped means, said first and second connectors positioned on said cradle so that said outer frame fits therebetween when said cradle is positioned over said outer frame;

an inner frame pivotally carried by said outer frame, said inner frame having a top surface, a first position and a second position;

means pivotally connected to said outer frame and said inner frame for supporting said inner frame between said first position and said second position; and at least one hydraulic cylinder operatively connected to said pivot mount and said outer frame, so that when said at least one cylinder actuates, said rear end of said outer frame raises with respect to the ground surface and said pivot mount on said at least one shaft increase in distance from said outer frame.

* * * * *